US011550994B2

(12) United States Patent
Schubert et al.

(10) Patent No.: US 11,550,994 B2
(45) Date of Patent: Jan. 10, 2023

(54) SYSTEM AND METHOD WITH DATA ENTRY TRACKER USING SELECTIVE UNDO BUTTONS

(71) Applicant: Oracle International Corporation, Redwood Shores, CA (US)

(72) Inventors: Aaron Schubert, Bozeman, MT (US); John Stites, Bozeman, MT (US); Bryan Luther, Belgrade, MT (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/658,250

(22) Filed: Jul. 24, 2017

(65) Prior Publication Data

US 2019/0026260 A1    Jan. 24, 2019

(51) Int. Cl.
*G06F 40/174* (2020.01)
*G06F 3/0483* (2013.01)
*G06F 40/197* (2020.01)
*G06F 3/0482* (2013.01)

(52) U.S. Cl.
CPC .......... *G06F 40/174* (2020.01); *G06F 3/0483* (2013.01); *G06F 40/197* (2020.01); *G06F 3/0482* (2013.01)

(58) Field of Classification Search
CPC .. G06F 17/243; G06F 3/0483; G06F 17/2288; G06F 3/0482; G06F 40/174; G06F 40/197
See application file for complete search history.

(56) References Cited

U.S. PATENT DOCUMENTS

| 9,229,920 B1* | 1/2016 | Fiedler | G06T 11/60 |
| 10,366,152 B2* | 7/2019 | Grimm | G06F 16/20 |
| 2009/0006454 A1* | 1/2009 | Zarzar | G06F 17/2247 |
| 2009/0271762 A1* | 10/2009 | Taylor | G06F 21/6227 707/999.107 |
| 2011/0107246 A1* | 5/2011 | Vik | G06F 9/451 715/771 |
| 2012/0047434 A1* | 2/2012 | Ginetti | G06F 40/166 715/255 |

(Continued)

OTHER PUBLICATIONS

Radu Popa, Title: Revision history in Google Sheets: Jan. 12, 2015 : https://youtu.be/abTT-GEo4dM (Year: 2015).*

*Primary Examiner* — Cesar B Paula
*Assistant Examiner* — Zelalem Shalu
(74) *Attorney, Agent, or Firm* — Kraguljac Law Group, LLC

(57) ABSTRACT

Example systems and methods for displaying an edit tracker of form-based entries on a graphical user interface are described herein. Form based data items including a name and a data entry box are displayed in an area of the graphical user interface. As edits are made to the data items (e.g., changed or new data values are added to the data entry boxes), an edit tracker entry for each changed data item is displayed. The edit tracker entries can include the item name of the data item, the item value of the data item, and the changed item value of the data item. As various modifications are made, some of which may be made within nested or other tabs of the graphical user interface, the edit tracker can include the entries, allowing the user to quickly identify changes, quickly navigate to the changes, and/or undo individual changes.

20 Claims, 11 Drawing Sheets

(56) References Cited

U.S. PATENT DOCUMENTS

| | | | |
|---|---|---|---|
| 2014/0033101 A1* | 1/2014 | Rein | G06F 17/30575 |
| | | | 715/771 |
| 2015/0039566 A1* | 2/2015 | Baumann | G06F 9/451 |
| | | | 707/684 |
| 2016/0179978 A1* | 6/2016 | Dhupar | G06F 9/451 |
| | | | 707/683 |
| 2017/0192952 A1* | 7/2017 | Lehmann | G06F 3/0481 |
| 2017/0206501 A1* | 7/2017 | Wang | G06Q 10/107 |
| 2017/0220546 A1* | 8/2017 | Codrington | G06F 16/2282 |

* cited by examiner

500

Displaying a plurality of data items in a graphical user interface, each data item of the plurality of data items having an item name and an item value, the item value being displayed in an editable field    505

Receiving, for a first data item of the plurality of data items via a first editable field displaying a first item value of the first data item, a changed first item value for the first data item    510

Displaying in an edit tracker region of the graphical user interface, an edit tracker entry for the first data item, the edit tracker entry comprising a first item name of the first data item, the first item value of the first data item, and the changed first item value of the first data item    515

Displaying an undo button with the edit tracker entry for the first data item    520

Receiving a selection of the undo button    525

In response to the selection of the undo button: removing the edit tracker entry for the first data item from the edit tracker region of the graphical user interface, and updating, in the data entry region of the graphical user interface, the first editable field displaying the changed first item value of the first data item with the first item value of the first data item    530

FIG. 5

```
                                                    ┌─ 900
                                                    ↙
┌─────────────────────────────────────────────────────────────────────────┐
│ Receiving, for a second data item of the plurality of data items via a second │
│   editable field displaying a second item value of the second data item, a    │
│      changed second item value for the second data item         905           │
└─────────────────────────────────────────────────────────────────────────┘
                                    ↓
┌─────────────────────────────────────────────────────────────────────────┐
│ Updating the edit tracker region of the graphical user interface to display a │
│ second edit tracker entry for the second data item, the second edit tracker   │
│ entry comprising a second item name of the second data item, the second      │
│ item value of the second data item, and the changed second item value of     │
│                     the second data item                        910           │
└─────────────────────────────────────────────────────────────────────────┘
                                    ↓
┌─────────────────────────────────────────────────────────────────────────┐
│ Updating the edit tracker region of the graphical user interface to display a │
│ first undo button associated with the edit tracker entry for the first data item, │
│  wherein selection of the first undo button updates the first editable field  │
│ displaying the changed first item value of the first data item with the first item │
│ value of the first data item and removes the edit tracker entry form the edit │
│            tracker region of the graphical user interface       915           │
└─────────────────────────────────────────────────────────────────────────┘
                                    ↓
┌─────────────────────────────────────────────────────────────────────────┐
│ Updating the edit tracker region of the graphical user interface to display a second │
│   undo button associated with the second edit tracker entry for the second data │
│   item, wherein selection of the second undo button updates the second editable │
│   field displaying the changed second item value of the second data item with the │
│   second item value of the second data item and removes the second edit tracker │
│        entry from the edit tracker region of the graphical user interface   920 │
└─────────────────────────────────────────────────────────────────────────┘
                                    ↓
┌─────────────────────────────────────────────────────────────────────────┐
│    Updating the edit tracker region of the graphical user interface to display an all │
│ undo button, wherein selection of the all undo button undoes all changes including │
│      1) updating, in the data entry region of the graphical user interface, the first │
│  editable field displaying the changed first item value of the first data item with the │
│   first item value of the first data item, 2) updating, in the data entry region of the │
│     graphical user interface, the second editable field displaying the changed second │
│   item value of the second data item with the second item value of the second data │
│        item, 3) removing the edit tracker entry from the edit tracker region of the │
│    graphical user interface, and 4) removing the second edit tracker entry from the │
│                 edit tracker region of the graphical user interface                │
│                                                                            925     │
└─────────────────────────────────────────────────────────────────────────┘
```

FIG. 9

SYSTEM AND METHOD WITH DATA ENTRY TRACKER USING SELECTIVE UNDO BUTTONS

BACKGROUND

Many applications include form-based interfaces with many including a multi-tabbed format for records and multi-sub-tabbed format within the record for various data. The result is that data can be buried for a single record within layers of tabs that must be navigated by a user. In such cases, when a user opens up a record (often within a tab) and begins to make edits, the user has no visual indication of which fields the user may have changed. Sometimes, the user will open a record, make changes, and keep the record open for some period of time because, for example, the user was distracted (e.g., called away to a meeting, received a phone call, and so forth). By the time the user decides to close the record, the user may have forgotten what changes were made. Upon trying to close the record, the user may be shown a dialog asking if the user would like to save changes. Often, the user cannot recall what changes were made.

Additionally, in some cases, the user determines that a previous change should not be saved. In existing systems, this may be done manually by searching through the tabs to find the change to be reversed and manually making the change, which also requires recalling what the original entry was. Another option is utilizing a feature that may be enabled that may reverse changes in reverse sequential order (i.e., pop each change off the stack; undo/redo; ctrl-z), which requires that all changes made subsequent to the change the user wants to reverse are also reversed.

In short, current systems lack the ability to easily track the changes made by the user. Accordingly, improvements are needed.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for displaying an edit tracker of form-based entries on a graphical user interface, the method including: displaying, in a data entry region of the graphical user interface, a plurality of data items, each data item of the plurality of data items having an item name and an item value, the item value being displayed in an editable field. The method also includes receiving, for a first data item of the plurality of data items via a first editable field displaying a first item value of the first data item, a changed first item value for the first data item. The method also includes displaying, in an edit tracker region of the graphical user interface, an edit tracker entry for the first data item, the edit tracker entry including a first item name of the first data item, the first item value of the first data item, and the changed first item value of the first data item. Other embodiments of this aspect include corresponding computer systems, apparatus, and computer programs recorded on one or more computer storage devices, each configured to perform the actions of the methods.

Implementations may include one or more of the following optional features. The method can include displaying an undo button with the edit tracker entry for the first data item. The method may also include receiving a selection of the undo button. The method may further include, in response to the selection of the undo button, removing the edit tracker entry for the first data item from the edit tracker region of the graphical user interface and updating, in the data entry region of the graphical user interface, the first editable field displaying the changed first item value of the first data item with the first item value of the first data item.

Optionally, the method may also include that the plurality of data items is a first plurality of data items associated with a first record in a database and the data entry region is a first data entry region in a first tab of the graphical user interface, the method may further include receiving a selection of a second record in the database. The method may also include generating a second tab for display in the graphical user interface, the second tab including a second data entry region. The method may also include displaying, in the second data entry region of the graphical user interface, a second plurality of data items, each data item of the second plurality of data items having an item name and an item value, the item value being displayed in an editable field. The method may also include removing display of the edit tracker entry for the first data item in the edit tracker region of the graphical user interface. The method may also include receiving, for a second data item of the second plurality of data items via a second editable field displaying a second item value of the second data item, a changed second item value. The method may also include displaying, in the edit tracker region of the graphical user interface, a second edit tracker entry for the second data item, the second edit tracker entry including a second item name of the second data item, the second item value of the second data item, and the changed second item value of the second data item. The method may also include that selection of the first tab can update the edit tracker region to display the edit tracker entry for the first data item. The method may also include that selection of the second tab updates the display of the edit tracker region to display the second edit tracker entry for the second data item.

Optionally, the method may include identifying a rule that applies to the first data item, the rule indicating that a change to the first item value of the first data item results in a change of a second item value for a second data item. The method may also include applying the rule. The method may also include updating the edit tracker region of the graphical user interface to display a second edit tracker entry for the second data item, the second edit tracker entry including a second item name of the second data item, the second item value of the second data item, and a changed second item value of the second data item.

Optionally, the method may include receiving a selection of the edit tracker entry for the first data item. The method may also include, in response to receiving the selection of the edit tracker entry for the first data item, updating the data entry region of the graphical user interface to place a focus of the graphical user interface on the first editable field.

Optionally, the method may include receiving, for a second data item of the plurality of data items via a second editable field displaying a second item value of the second data item, a changed second item value for the second data item. The method may also include updating the edit tracker region of the graphical user interface to display a second edit tracker entry for the second data item, the second edit tracker entry including a second item name of the second data item, the second item value of the second data item, and the changed second item value of the second data item. The method may also include updating the edit tracker region of the graphical user interface to display a first undo button associated with the edit tracker entry for the first data item, where selection of the first undo button updates the first editable field displaying the changed first item value of the first data item with the first item value of the first data item and removes the edit tracker entry from the edit tracker region of the graphical user interface. The method may also include updating the edit tracker region of the graphical user interface to display a second undo button associated with the second edit tracker entry for the second data item, where selection of the second undo button updates the second editable field displaying the changed second item value of the second data item with the second item value of the second data item and removes the second edit tracker entry from the edit tracker region of the graphical user interface. The method may also include updating the edit tracker region of the graphical user interface to display an all undo button, where selection of the all undo button undoes all changes including 1) updating, in the data entry region of the graphical user interface, the first editable field displaying the changed first item value of the first data item with the first item value of the first data item, 2) updating, in the data entry region of the graphical user interface, the second editable field displaying the changed second item value of the second data item with the second item value of the second data item, 3) removing the edit tracker entry from the edit tracker region of the graphical user interface, and 4) removing the second edit tracker entry from the edit tracker region of the graphical user interface.

Optionally, the method may include that the graphical user interface is an interface for a customer relationship management program used by service agents to handle support tickets for an enterprise. Implementations of the described techniques may include hardware, a method or process, or computer software on a computer-readable medium.

BRIEF DESCRIPTION OF THE DRAWINGS

FIG. 5 illustrates a flowchart for implementing an edit tracker according to an embodiment.

FIG. 9 illustrates a flowchart for implementing an edit tracker according to an embodiment.

DETAILED DESCRIPTION

Figure 1:
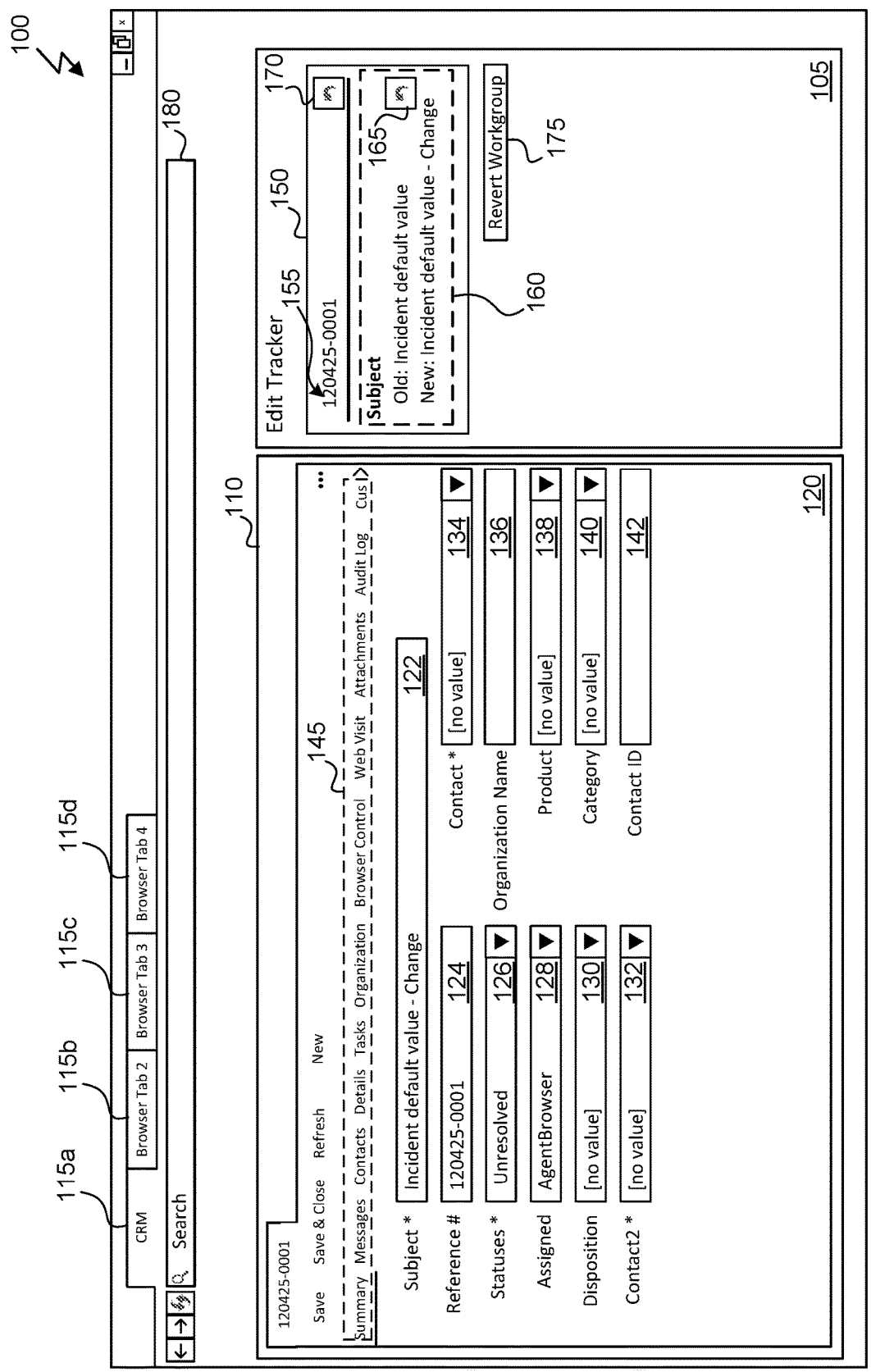
FIG. 1 illustrates a graphical user interface including an edit tracker according to an embodiment.

Embodiments described herein provide a solution to the difficulties described above. Described herein are embodiments of an edit tracking tool which can allow users of form-based pages to see all changes that have been made by the user to a record and show all changes in real time. Regardless of the number of changes made, the tool can allow users to not only identify easily the changes made, but also to back out (i.e., revert or reverse) some changes and not others. Embodiments described herein provide functionality that allows for granular changes and provides a way to easily identify changes that are to be committed to the database.

In the following description, for the purposes of explanation, numerous specific details are set forth in order to provide a thorough understanding of various embodiments. It will be apparent, however, to one skilled in the art that embodiments may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, and various other non-transitory mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements and are stored on a machine-readable medium. A code segment may be coupled to another code segment or a hardware circuit during execution by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

FIG. 1 illustrates a graphical user interface 100 including multiple tabs 115a, 115b, 115c, and 115d. The selected tab 115a can include an edit tracker 105, a data entry region 110, and a search bar 180. The data entry region 110 can include a record tab 120. The record tab 120 can include data entry boxes 122, 124, 126, 128, 130, 132, 134, 136, 138, 140, and 142. The record tab 120 can also include menu 145. The edit tracker 105 can include an edit tracker record 150.

Graphical user interface 100 can be, for example, a web browser such as Internet Explorer® or Google Chrome®. Optionally, graphical user interface 100 can be implemented in any application to provide the described functionality. Graphical user interface 100 can include multiple tabs 115a, 115b, 115c, and 115d. Though four tabs are shown, more or fewer tabs can be available. Each tab can be, for example, a different interface, web page, or other portal. The selected tab 115a can include a customer relationship management ("CRM") application with an edit tracker implemented as shown.

The selected tab 115a can include a data entry region 110. The data entry region 110 can include a record tab 120. Though only one record tab 120 is depicted in FIG. 1, more record tabs can be utilized with each record tab 120 having information associated with a different record in a database, for example.

The record tab 120 can include a menu 145 that provides different views or subtabs of the associated record. For example, as shown in menu 145, there is at least a summary view, messages view, contacts view, details view, tasks view, organization view, browser control view, web visit view, attachments view, and audit log view. Menu 145 continues past the viewable portion of the screen, which can be scrolled for viewing. The summary view of menu 145 can be selected as shown in FIG. 1 and can provide a view of, for example, summary information for the record. There are multiple data entry boxes that display current information, if available, and allow for modification of the stored data. The record shown in record tab 120 can be a record from a database, such as database 1014 or 1016 of FIG. 10.

The various data entry boxes can have, for example, a name associated with the data item. For example, data entry box 122 can have a data item name of Subject and an initial data value of "Incident default value." After a modification by a user of graphical user interface 100, the data value for data entry box 122 can be "Incident default value—Change" as shown in FIG. 1. The other data entry boxes also have data item names and data item values. For example, data entry box 124 has a data item name of "Reference #" and a data item value of "120425-0001", data entry box 126 has a data item name of "Statuses" and a data item value of "Unresolved." Data entry box 128 has a data item name of "Assigned" and a data item value of "AgentBrowser." Data entry box 130 has a data item name of "Disposition" and the data item value is blank, which appears in the dropdown box as "[no value]." Data entry box 132 has a data item name of "Contact2" and the data item value is blank, which is displayed in the dropdown box as "[no value]." Data entry box 134 has a data item name of "Contact" and the data item value is blank, which is displayed in the dropdown box as "[no value]." Data entry box 136 has a data item name of "Organization Name" and the data item value is blank. Data entry box 138 has a data item name of "Product" and the data item value is blank, which appears in the dropdown box as "[no value]." Data entry box 140 has a data item name of "Category" and the data item value is blank, which is displayed in the dropdown box as "[no value]." Data entry box 142 has a data item name of "Contact ID" and the data item value is blank. For data item values that are required by the CRM application, an asterisk ("*") can be shown following the data item name to indicate it is a required value (e.g., "Subject *").

Some of the data item values can be selected from a dropdown box rather than entered in a text box. For example, data entry boxes 126, 128, 130, 132, 134, 138, and 140 are dropdown boxes. Data entry boxes 122, 124, 136, and 142 are each text boxes. Other types of data entry boxes can optionally be used, such as radio buttons, check boxes, and so forth.

The selected tab 115a can include edit tracker 105. Edit tracker 105 can include edit tracker record 150. While only one edit tracker record 150 is shown, any number of edit tracker records 150 can be displayed. Edit tracker record 150 can show, for example an entry for record 155, which corresponds to the record shown in record tab 120. The edit tracker record 150 can include an edit tracker entry 160. Edit tracker entry 160 can include the data item name for the data item that is being tracked; in this case, "Subject" is the data item name. Edit tracker entry 160 can also include the old value of the data item value; in this case, "Incident default value" is the old or original data item value. Edit tracker entry 160 can also include the new value of the data item value; in this case, "Incident default value—Change" is the new or changed data item value. In this way, the edit tracker entry 160 can show the data item name, the original data item value, and the changed data item value. Edit tracker entry can also include an undo button 165. If the undo button 165 is selected, the edit tracker entry 160 can be undone (i.e., reversed or reverted). Stated differently, the data item value can be reversed to the old value or original value. For the example shown in FIG. 1, if undo button 165 were selected, the data item value for the data item "Subject" could be reversed to "Incident default value." The edit tracker entry 160 could also be removed from edit tracker record 150.

Edit tracker record 150 can also include a record undo button 170. The record undo button 170 can reverse all changes for the record. In FIG. 1, only a single edit tracker entry 160 is shown in edit tracker record 150. In some cases, several edit tracker entries 160 can be displayed in edit tracker record 150. All edit tracker entries 160 within edit tracker record 150 can be reversed by selection of record undo button 170.

Edit tracker 105 includes only one edit tracker record 150. In some cases, multiple records can be edited, resulting in multiple edit tracker records 150. Edit tracker 105 can also include a revert workgroup button 175. The revert workgroup button 175 can reverse all changes to all records shown in edit tracker 105.

The selected tab 115a can include search bar 180. Users can type in a record number or other data to find/search for a record to view in record tab 120.

In use, a user can view graphical user interface 100 in, for example, a web browser. The user can use search bar 180 to find a record to review and edit in record tab 120. Upon selection of a record (e.g., record 120425-0001), the record data items and data item values can populate record tab 120. Upon changing a value of a data item (e.g., the "Subject" data item), an edit tracker entry can be displayed in an edit tracker region (e.g., edit tracker entry 160 in edit tracker 105).

Figure 2:
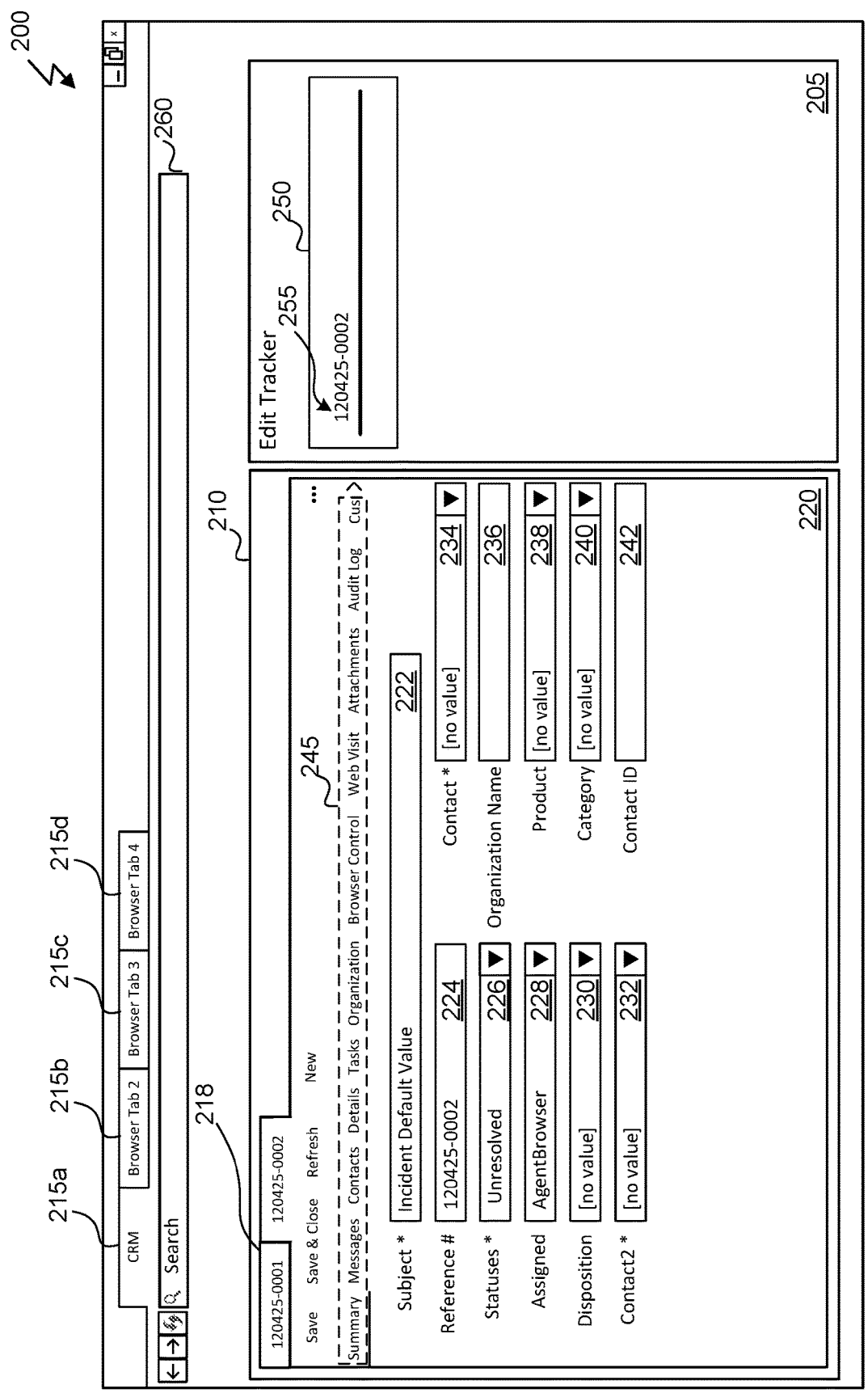
FIG. 2 illustrates a graphical user interface including an edit tracker according to an embodiment.

FIG. 2 illustrates a graphical user interface 200. Graphical user interface 200 can include multiple tabs 215a, 215b, 215c, and 215d. Selected tab 215a can include an edit tracker 205, a data entry region 210, and a search bar 260. The data entry region 210 can include a record tabs 218 and 220. The record tabs 218 and 220 can include data entry boxes 222, 224, 226, 228, 230, 232, 234, 236, 238, 240, and 242. The record tabs 218 and 220 can also include menu 245. The edit tracker 205 can include an edit tracker record 250.

Graphical user interface 200 can be, for example, a web browser such as Internet Explorer® or Google Chrome®. Optionally, graphical user interface 200 can be implemented in any application to provide the described functionality. Graphical user interface 100 can include multiple tabs 215a, 215b, 215c, and 215d. Though four tabs are shown, more or fewer tabs can be available. Each tab can be, for example, a different interface, web page, or other portal. The selected tab 215a can include a CRM application with an edit tracker implemented as shown.

The selected tab 215a can include a data entry region 210. The data entry region 210 can include record tabs 218 and 220. Any number of record tabs can be utilized, with each record tab 218 and 220 having information associated with a different record in a database, for example, record 120425-0001 for record tab 218 and record 120425-0002 for record tab 220.

The selected record tab 220 can include a menu 245 that provides different views or subtabs of the associated record. For example, as shown in menu 245, there is at least a summary view, messages view, contacts view, details view, tasks view, organization view, browser control view, web visit view, attachments view, and audit log view. Menu 245 continues past the viewable portion of the screen, which can be scrolled for viewing. The summary view of menu 245 can be selected as shown in FIG. 2 and can provide a view of, for example, summary information for the record. There are multiple data entry boxes that display current information, if available, and allow for modification of the stored data. The record shown in record tab 220 can be a record from a database, such as database 1014 or 1016 of FIG. 10.

The various data entry boxes can have, for example, a name associated with the data item. For example, data entry box 222 can have a data item name of "Subject" and an initial data value of "Incident Default Value." The other data entry boxes also have data item names and data item values. For example, data entry box 224 has a data item name of "Reference #" and a data item value of "120425-0002," data entry box 226 has a data item name of "Statuses" and a data item value of "Unresolved." Data entry box 228 has a data item name of "Assigned" and a data item value of "Agent-Browser." Data entry box 230 has a data item name of "Disposition" and the data item value is blank, which appears in the dropdown box as "[no value]." Data entry box 232 has a data item name of "Contact2" and the data item value is blank, which is displayed in the dropdown box as "[no value]." Data entry box 234 has a data item name of "Contact" and the data item value is blank, which is displayed in the dropdown box as "[no value]." Data entry box 236 has a data item name of "Organization Name" and the data item value is blank. Data entry box 238 has a data item name of "Product" and the data item value is blank, which appears in the dropdown box as "[no value]." Data entry box 240 has a data item name of "Category" and the data item value is blank, which is displayed in the dropdown box as "[no value]." Data entry box 242 has a data item name of "Contact ID" and the data item value is blank. For data item values that are required by the CRM application, an asterisk ("*") can be shown following the data item name to indicate it is a required value (e.g., "Subject *").

Some of the data item values can be selected from a dropdown box rather than entered in a text box. For example, data entry boxes 226, 228, 230, 232, 234, 238, and 240 are dropdown boxes. Data entry boxes 222, 224, 236, and 242 are each text boxes. Other types of data entry boxes can optionally be used, such as radio buttons, check boxes, and so forth.

The selected tab 215a can include edit tracker 205. Edit tracker 205 can include edit tracker record 250. While only one edit tracker record 250 is shown, any number of edit tracker records 250 can be displayed. Edit tracker record 250 can show, for example an entry for record 255, which corresponds to the record shown in record tab 220. The edit tracker record 250 can be blank, as shown in FIG. 2. Optionally, selection of record tab 218 can modify the display of edit tracker record 250 to display the edit tracker record corresponding to the record associated with record tab 218.

Figure 3:
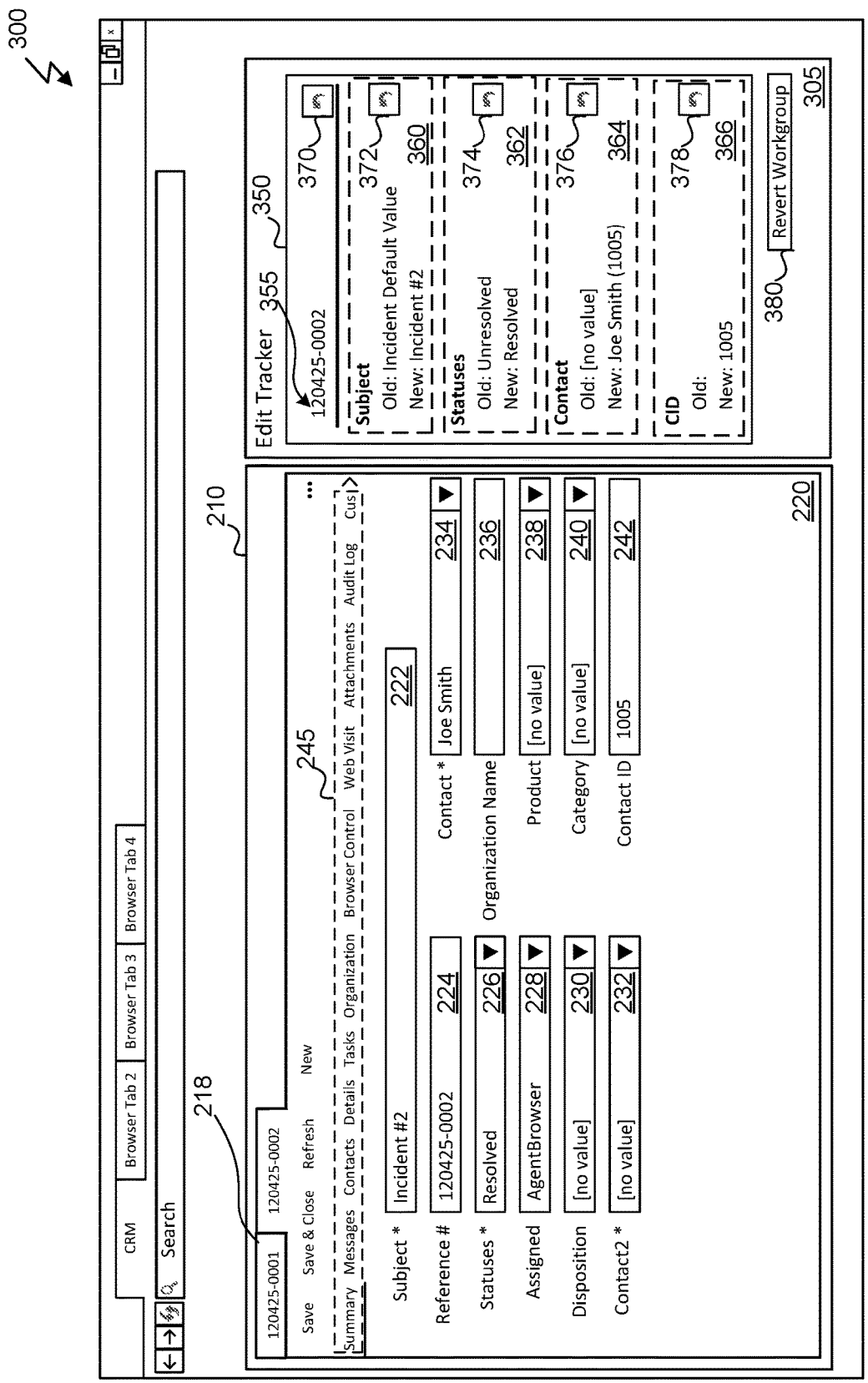
FIG. 3 illustrates a graphical user interface including an edit tracker according to an embodiment.

FIG. 3 illustrates a graphical user interface 300. Graphical user interface 300 shows the same selected record tab 220 as FIG. 2. Edit tracker 305 can include edit tracker record 350. While only one edit tracker record 350 is shown, any number of edit tracker records 350 can be displayed. Edit tracker record 350 can show, for example entries for record 355, which corresponds to the record shown in record tab 220.

The edit tracker record 350 can include an edit tracker entry 360. Edit tracker entry 360 can include the data item name for the data item that is being tracked; in this case "Subject" is the data item name. Edit tracker entry 360 can also include the old value of the data item value; in this case, "Incident Default Value" is the old or original data item value. Edit tracker entry 360 can also include the new value of the data item value; in this case, "Incident #2" is the new or changed data item value. As can be seen by data entry box 222, the user can change the value in the data entry box 222 by typing text into the text box, causing the edit tracker entry 360 to be created. In this way, the edit tracker entry 360 can show the data item name, the original data item value, and the changed data item value. Edit tracker entry 360 can also include an undo button 372. If the undo button 372 is selected, the edit tracker entry 360 can be undone (i.e., reversed or reverted). Stated differently, the data item value can be reversed to the old value or original value. For the example shown in FIG. 3, if undo button 372 is selected, the data item value for the data item "Subject" can be reversed to "Incident Default Value," and the edit tracker entry 360 can be removed from edit tracker record 350.

Similarly, the edit tracker record 350 can include an edit tracker entry 362. Edit tracker entry 362 can include the data item name for the data item that is being tracked; in this case "Statuses" is the data item name. Edit tracker entry 362 can also include the old value of the data item value; in this case "Unresolved" is the old or original data item value. Edit tracker entry 362 can also include the new value of the data item value; in this case, "Resolved" is the new or changed data item value. Data entry box 226 is a dropdown box, so the user can select a different value from the dropdown box; in this case "Resolved" was selected. The new selection can cause the edit tracker entry 362 to be generated. In this way, the edit tracker entry 362 can show the data item name, the original data item value, and the changed data item value. Edit tracker entry 362 can also include an undo button 374. If the undo button 374 is selected, the edit tracker entry 362 can be undone (i.e., reversed or reverted). Stated differently, the data item value can be reversed to the old value or original value. For the example shown in FIG. 3, if undo button 374 is selected, the data item value for the data item "Statuses" can be reverted to "Unresolved," and the edit tracker entry 362 can be removed from edit tracker record 350.

Edit tracker record 350 can also include an edit tracker entry 364. Edit tracker entry 364 can include the data item name for the data item that is being tracked; in this case "Contact" is the data item name. Edit tracker entry 364 can also include the old value of the data item value; in this case the value was blank. Edit tracker entry 364 can also include the new value of the data item value; in this case, "Joe Smith (1005)" is the new or changed data item value. Data entry box 234 is a dropdown box, so the user can select a different value from the dropdown box, in this case "Joe Smith (1005)." In this way, the edit tracker entry 364 can show the data item name, the original data item value, and the changed data item value. Edit tracker entry 364 can also include an undo button 376. If the undo button 376 is selected, the edit tracker entry 364 can be undone (i.e., reversed or reverted). Stated differently, the data item value for can be reversed to the old value or original value. For the example shown in FIG. 3, if undo button 376 is selected, the data item value for the data item "Contact" can be reverted to a blank value, and the edit tracker entry 364 can be removed from edit tracker record 350.

Further, the edit tracker record 350 can include an edit tracker entry 366. Edit tracker entry 366 can be linked to edit tracker entry 364. Optionally, as an example, edit tracker entry 366 can include the data item name for the data item that is being tracked. In FIG. 3, "Contact ID" is the data item name associated with edit tracker entry 366. Edit tracker entry 366 can include the old or original value of the data item value. In this case the value was originally blank. Edit tracker entry 366 can also include the new value of the data item value. In this case, the new data item value is "1005." Data entry box 242 is a text box, so the user can enter a different value (e.g., "1005") into the text box. In this way, the edit tracker entry 366 can show the data item name, the original data item value, and the changed data item value. Edit tracker entry 366 can also include an undo button 378. If the undo button 378 is selected, the edit tracker entry 366 can be undone (i.e., reversed or reverted). Stated differently, the data item value can be reversed to the old value or original value. For the example shown in FIG. 3, if undo button 378 is selected, the data item value for the data item "Contact ID" can be reverted to a blank value, and the edit tracker entry 366 can be removed from edit tracker record 350. Data entry boxes can be linked such that edit tracker entries can be linked. For example, edit tracker entry 364 can be linked to edit tracker entry 366. For example, if the user types 1005 into text box 242, the contact associated with contact ID 1005 can be "Joe Smith." This change can cause data entry box 234 to change value to "Joe Smith" because data entry box 242 can be linked to data entry box 234 based on their data values. These changes can cause the corresponding edit tracker entries 364 and 366 to be generated and displayed in edit tracker 305.

Edit tracker record 350 can also include a record undo button 370. The record undo button 370 can reverse all changes for the record. For example, edit tracker entries 360, 362, 364, and 366 can all revert to their old or original values by selection of record undo button 370.

Edit tracker 305 includes only one edit tracker record 350. In some cases, multiple records can be edited, resulting in multiple edit tracker records 350. Edit tracker 305 can also include a revert workgroup button 380. The revert workgroup button 380 can reverse all changes to all records shown in edit tracker 305.

Figure 4:
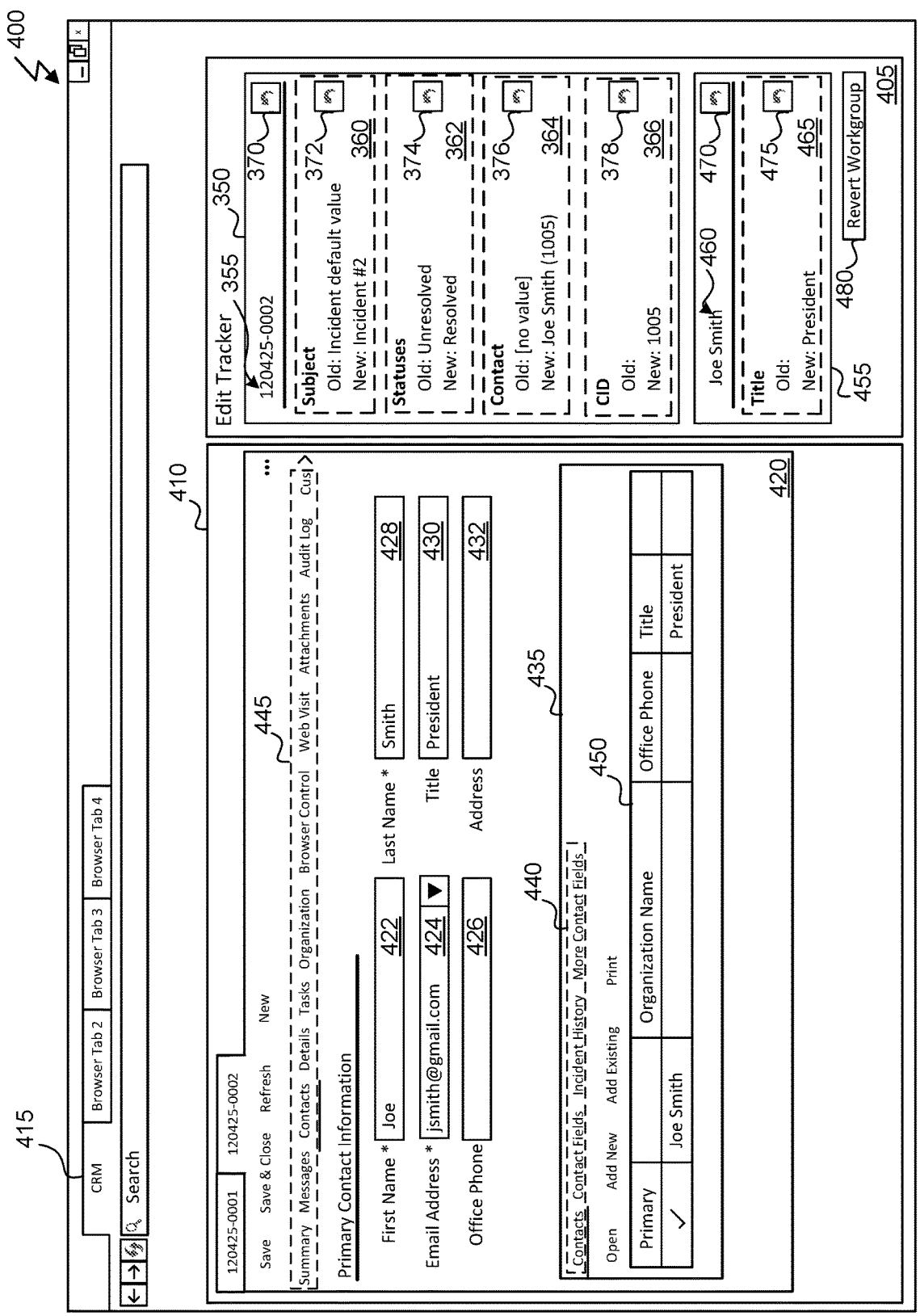
FIG. 4 illustrates a graphical user interface including an edit tracker according to an embodiment.

FIG. 4 illustrates a graphical user interface 400 including a selected tab 415. The selected tab 415 can include an edit tracker 405 and a data entry region 410. The data entry region 410 can include a record tab 420, which is selected. There can be multiple record tabs. The record tab 420 can include data entry boxes 422, 424, 426, 428, 430, and 432. The record tab 420 can also include menu 445. The edit tracker 405 can include edit tracker records 350 and 455.

Graphical user interface 400 can be, for example, a web browser such as Internet Explorer® or Google Chrome®. Optionally, graphical user interface 400 can be any application that provides the described interface. Graphical user interface 400 can include multiple tabs, including selected tab 415. Each tab can be, for example, a different interface, web page, or other portal. The selected tab 415 can include a CRM application with an edit tracker implemented as shown.

The selected tab 415 can include a data entry region 410. The data entry region 410 can include a record tab 420. Record tab 420 can include information associated with a record in a database, for example.

The record tab 420 can include a menu 445 that provides different views or subtabs of the associated record. For example, as shown in menu 445, there is a summary view, messages view, contacts view, details view, tasks view, organization view, browser control view, web visit view, attachments view, and audit log view. Menu 445 continues past the viewable portion of the screen, which can be scrolled for viewing. The Contacts view of menu 445 can be selected as shown in FIG. 4 and can provide a view of, for example, contact information for the record. There can be multiple data entry boxes 422, 424, 426, 428, 430, and 432 that display current information, if available, and allow for modification of the stored data. The record shown in record tab 420 can be a record from a database, such as database 1014 or 1016 of FIG. 10.

The various data entry boxes can have, for example, a name associated with the data item. For example, data entry box 422 can have a data item name of "First Name" and an initial data value of "Joe." The other data entry boxes also have data item names and data item values. For example, data entry box 424 has a data item name of "Email Address" and a data item value of "jsmith@gmail.com." Data entry box 426 has a data item name of "Office Phone" and the data item value is blank. Data entry box 428 has a data item name of "Last Name" and a data item value of "Smith." Data entry box 430 has a data item name of "Title" and the data item value is "President." Data entry box 432 has a data item name of "Address" and the data item value is blank. For data item values that are required by the CRM application, an asterisk ("*") can be shown following the data item name to indicate it is a required value (e.g., "First Name *").

While text boxes are one way of entering data values as depicted in FIG. 4, other types of data entry boxes can optionally be used, such as radio buttons, check boxes, dropdown boxes, and so forth.

Record tab 420 can additionally have information box 435, which can contain even deeper subtab information. There is a menu 440 in information box 435. Menu 440 can contain additional subtabs or views including a contacts view, a contact fields view, an incident history view, and a more contact fields view. The contacts view is selected, and can display a table 450 of contact information associated with record 120425-0002.

Edit tracker 405 can include edit tracker record 350, which contains the same information as described with respect to the corresponding numbered elements of FIG. 3. Edit tracker 405 can also include edit tracker record 455. Edit tracker record 455 can show, for example an entry for record 460, which corresponds to the contact record shown in the contacts subtab selected by menu 445. The edit tracker record 455 can include an edit tracker entry 465. Edit tracker entry 465 can include the data item name for the data item that is being tracked; in this case, "Title" is the data item name. Edit tracker entry 465 can also include the old value of the data item value; in this case the old or original value was blank. Edit tracker entry 465 can also include the new value of the data item value; in this case, "President" is the new or changed data item value. In this way, the edit tracker entry 465 can show the data item name, the original data item value, and the changed data item value. Edit tracker entry 465 can also include an undo button 475. If the undo button 475 is selected, the edit tracker entry 465 can be undone. Stated differently, the data item value can be reverted to the old value or original value. For the example shown in FIG. 4, if undo button 475 is selected, the data item value for the data item "Title" can be reversed to a blank value, and the edit tracker entry 465 can be removed from edit tracker record 455.

Edit tracker record 455 can also include a record undo button 470. The record undo button 470 can reverse all changes for the record. In FIG. 4, only a single edit tracker entry 465 is shown in edit tracker record 455. In some cases, several edit tracker entries 465 can be displayed in edit tracker record 455. All edit tracker entries 465 can be reverted by selection of record undo button 470. Similarly, record undo button 370 can reverse edit tracker entries 360, 362, 364, and 366 if selected.

Edit tracker 405 includes only two edit tracker records 350 and 455, though any number of edit tracker records can be displayed. Edit tracker 405 can also include a revert workgroup button 480. The revert workgroup button 480 can reverse all changes to all records shown in edit tracker 405. For example, selection of the revert workgroup button 480 can reverse each of the edit tracker entries 360, 362, 364, 366, and 465.

FIG. 5 illustrates a flowchart 500 for implementing an edit tracker. The method of flowchart 500 can be implemented in, for example, any of the graphical user interfaces 100, 200, 300, or 400. The method of flowchart 500 can be implemented by, for example, the computer system 1200 of FIG. 12. The method begins at 505 by displaying data items in a graphical user interface, such as graphical user interface 100. Each data item can have an item name and an item value, the item value being displayed in an editable field. For example, as shown in FIG. 1, several data items are shown, such as the data item named "Subject" with a data item value of "Incident default value" shown in the data entry box 122.

At 510, the system can receive through an editable field a changed item value for the data item. For example, in FIG. 1, the changed data item value of "Incident default value—Change" was entered.

At 515, the system can display in an edit tracker region of the graphical user interface, an edit tracker entry for the data item. The edit tracker entry can include the name of the data item, the old or original value of the data item, and the changed value of the data item. For example, the edit tracker entry 160 of FIG. 1 shows the item name of "Subject," the old data item value of "Incident default value," and the new data item value of "Incident default value—Change."

At 520, optionally, the system can include with the edit tracker entry an undo button for the data item. For example, the undo button 165 of FIG. 1. At 525, optionally, the system can receive a selection of the undo button. At 530, optionally, the system can, in response to receiving a selection of the undo button, reverse the change associated with the edit tracker entry. Stated differently, in response to receiving selection of the undo button, the system can replace the new data item value with the old or original data item value. Optionally, the system can remove the edit tracker entry. And, optionally, the system can update the graphical user interface to show the original or old value for the data item in the associated editable field.

Figure 6:
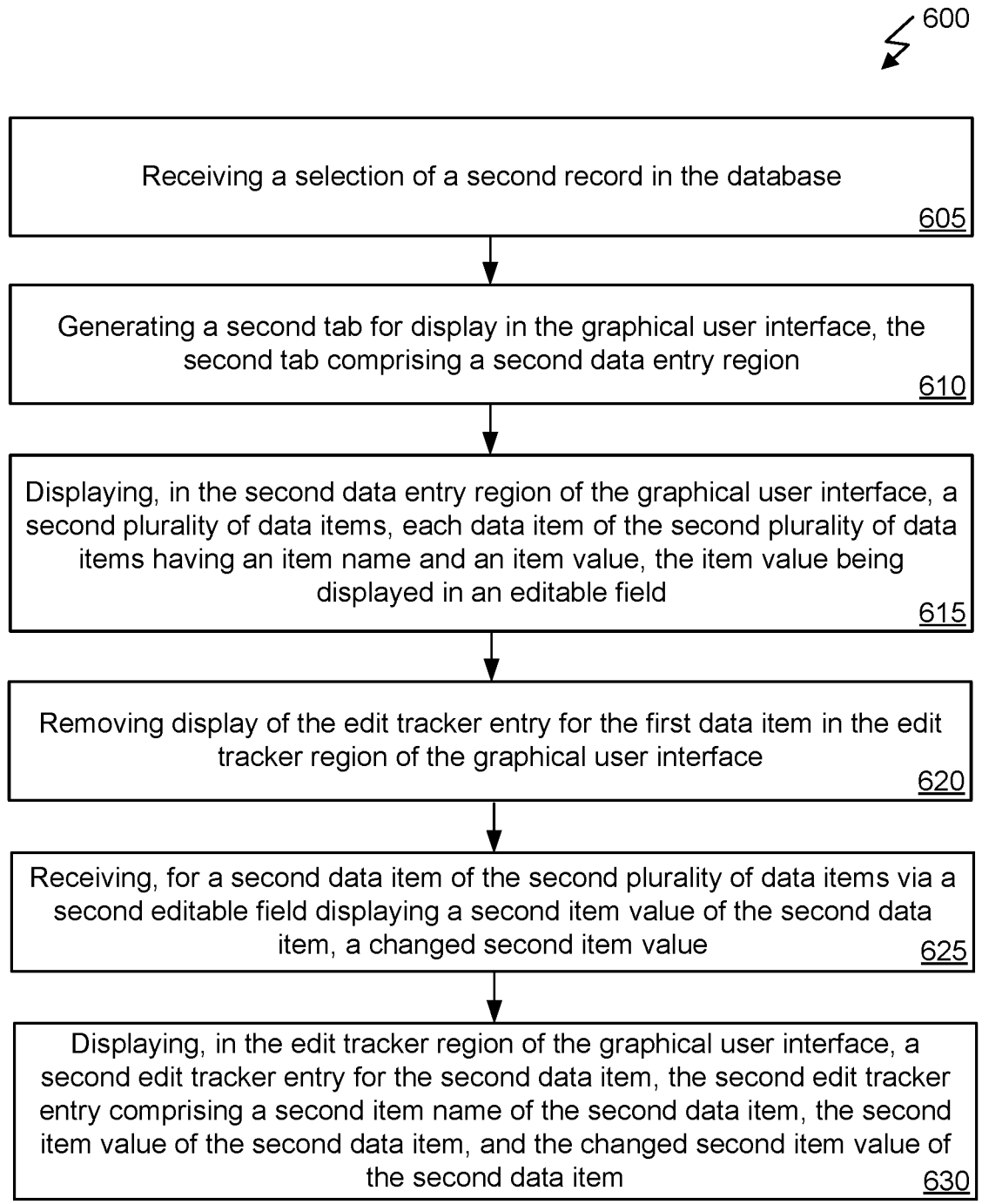
FIG. 6 illustrates a flowchart for implementing an edit tracker according to an embodiment.

FIG. 6 illustrates a flowchart 600 for implementing an edit tracker. The method of flowchart 600 can be implemented in, for example, any of the graphical user interfaces 100, 200, 300, or 400. The method of flowchart 600 can be implemented by, for example, the computer system 1200 of FIG. 12. The method of flowchart 600 can be used in conjunction with or following the method of flowchart 500. The method begins at 605 by receiving a selection of a second record in the database. At 610, the system can generate a second tab for display in the graphical user interface, the second tab including a second data entry region. For example, the record tab 220 displayed in FIG. 2 is a second record and data entry region from the first record tab 218, which is depicted as record tab 120 in FIG. 1.

At 615, the system can display data items in the record tab, each data item having an item name and an item value displayed in an editable field. For example, as shown in FIG. 2, several data items are shown, such as the data item named "Assigned" with a data item value of "AgentBrowser" shown in the data entry box 228.

At 620, the system can optionally remove display of the edit tracker entry for the first data item in the edit tracker region of the graphical user interface. Stated differently, because a second record is selected, the edit tracker region can display the edit tracker entries for the second record and no longer display the edit tracker entries of the first record while the second record is selected. For example, in FIG. 1, record 120425-0001 showed an edit tracker record 150. In FIG. 2, the second record 120245-0002 is displayed in the data entry region and the edit tracker record 150 is no longer displayed. Instead, edit tracker record 250 is displayed that corresponds with record 120425-0002. Optionally, all edit tracker entries for all open records can be displayed.

At 625, the system can receive a changed item value for an item in the second record. For example, a user can modify an item value in the graphical user interface for an item in the second record. As an example from FIG. 3, a user can update the status to resolved using the data entry box 226.

At 630, the system can display in the edit tracker region of the graphical user interface, an edit tracker entry for the changed data item of the second record. The edit tracker entry can include the name of the data item, the old or original value of the data item and the changed value of the data item. For example, the edit tracker entry 362 of FIG. 3 shows the item name of "Statuses," the old data item value of "Unresolved," and the new data item value of "Resolved."

Figure 7:
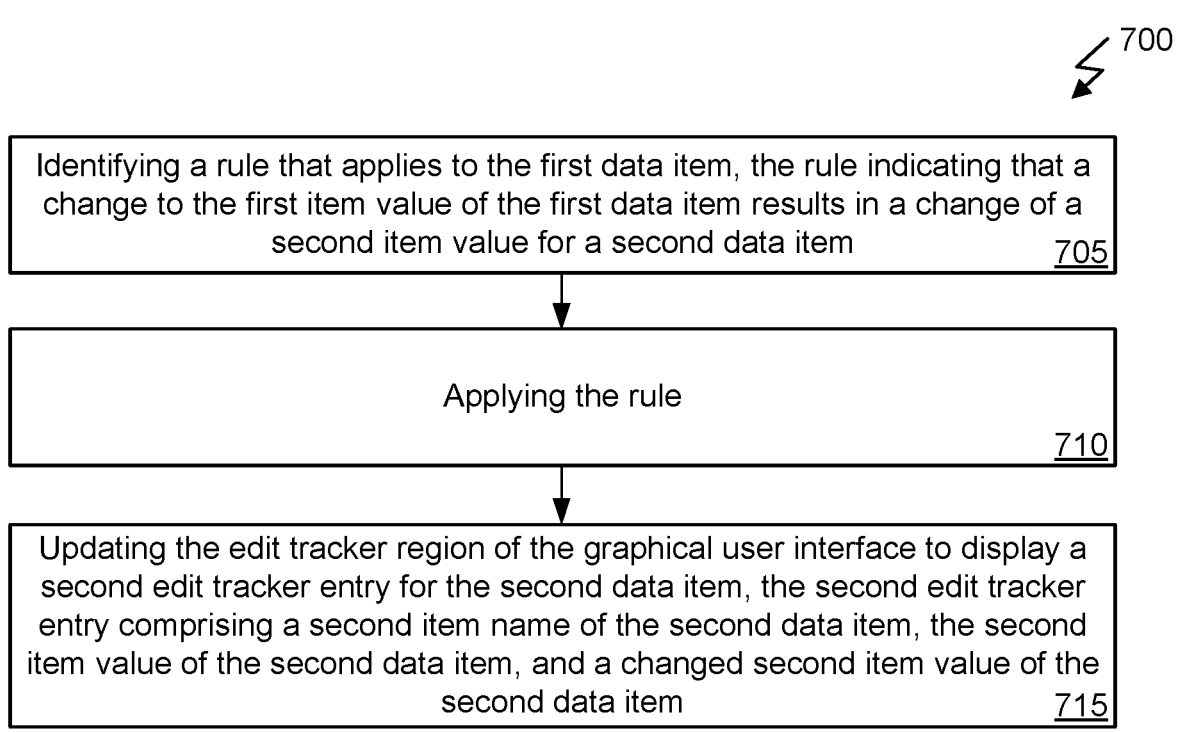
FIG. 7 illustrates a flowchart for implementing an edit tracker according to an embodiment.

FIG. 7 illustrates a flowchart 700 for implementing an edit tracker. The method of flowchart 700 can be implemented in, for example, any of the graphical user interfaces 100, 200, 300, or 400. The method of flowchart 700 can be implemented by, for example, the computer system 1200 of FIG. 12. The method of flowchart 700 can be used following or in conjunction either of the methods of flowcharts 500 and 600. The method can begin at 705 with identifying a rule that applies to a data item, the rule indicating that change to that data item value results in a change to a different data item value. For example, a change to the contact based on data entry box 234 of FIG. 3 can include a rule that requires a change to the contact ID, as shown in data entry box 242 of FIG. 3. Stated differently, selection of a contact name in data entry box 234 can cause an update to the contact ID in box 242 so that the contact ID matches the contact name.

The method can continue at 710 by applying the rule. Applying the rule can include updating the data item value for both linked data items. At 715 the method can continue by updating the edit tracker region of the graphical user interface to display an edit tracker entry for the additional data item. For example, modification of the contact via the data entry box 234 in FIG. 3 can result in the contact ID to be correspondingly updated in box 242. Additionally, the modifications can appear in the edit tracker region at edit tracker entries 364 and 366.

Figure 8:
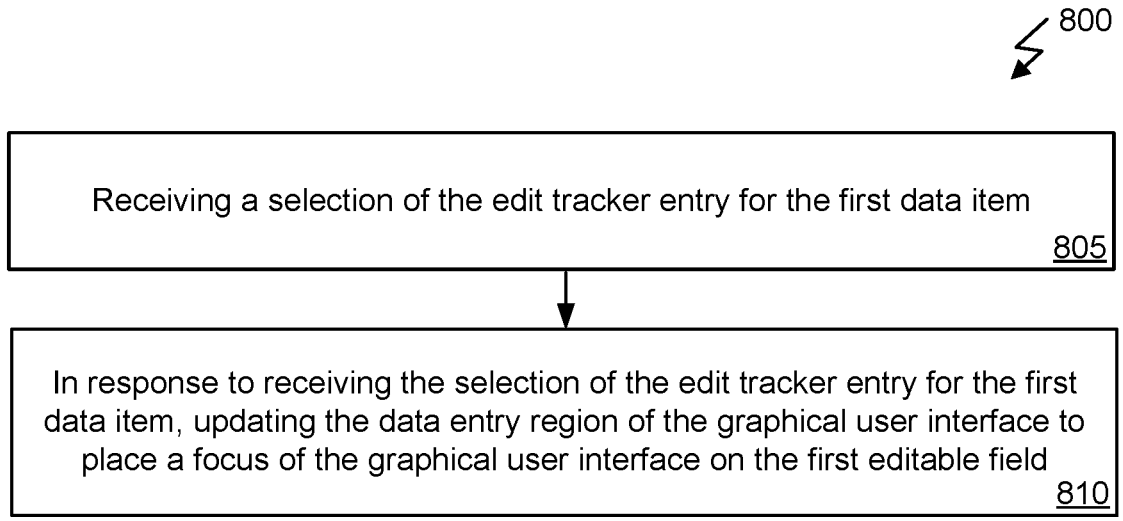
FIG. 8 illustrates a flowchart for implementing an edit tracker according to an embodiment.

FIG. 8 illustrates a flowchart 800 for implementing an edit tracker. The method of flowchart 800 can be implemented in, for example, any of the graphical user interfaces 100, 200, 300, or 400. The method of flowchart 800 can be implemented by, for example, the computer system 1200 of FIG. 12. The method of flowchart 800 can be used following or in conjunction any of the methods of flowcharts 500, 600, and 700. The method can begin at 805 with receiving a selection of an edit tracker entry. For example, the edit tracker entry 160 of FIG. 1 can be clickable. For example, the item name (e.g., "Subject"), the old item value (e.g., "Incident default value"), and/or the new item value (e.g., "Incident default value—Change") can be a hyperlink or otherwise available for selection.

At 810, in response to receiving the selection of the edit tracker entry, the system can update the data entry region of the graphical user interface to place a focus of the graphical user interface on the editable data entry field associated with the edit tracker entry. For example, clicking the edit tracker entry 364 of FIG. 4 can cause the data entry region 410 to place a focus back on the data entry box 234 of FIG. 3 such that the graphical user interface is updated to display the summary view of the record and the input focus (e.g., mouse pointer) is put on data entry box 234.

FIG. 9 illustrates a flowchart 900 for implementing an edit tracker. The method of flowchart 900 can be implemented in, for example, any of the graphical user interfaces 100, 200, 300, or 400. The method of flowchart 900 can be implemented by, for example, the computer system 1200 of FIG. 12. The method of flowchart 900 can be used following or in conjunction any of the methods of flowcharts 500, 600, 700, and 800. The method can begin at 905 with receiving another changed item value for a different data item.

In response to receiving the changed item value, the method can continue at 910 with updating the edit tracker region of the graphical user interface to display a second edit tracker entry for the changed data item value. For example, there are multiple edit tracker entries for multiple data items and data item values in FIGS. 3 and 4.

At 915, the edit tracker region can be updated to display an undo button associated with a first of the multiple edit tracker entries. For example undo button 372 for edit tracker entry 360 in FIG. 3 is displayed. As described with respect to undo button 372, selection of undo button 372 can cause the system to update the data entry box 222 with the original value of "Incident Default Value" and remove the edit tracker entry 360.

At 920, the edit tracker region can be updated to display an undo button associated with a second of the multiple edit tracker entries. For example, undo button 374 for edit tracker entry 362 in FIG. 3 is displayed. As described with respect to undo button 374, selection of undo button 374 can cause the system to update the data entry box 226 with the original or old value of "Unresolved" and remove the edit tracker entry 362.

At 925, the system can update the edit tracker region of the graphical user interface with an all undo button. For example, the record undo button 370 of FIG. 3. Selection of the all undo button can cause the updates to all of the edit tracker entries to be reverted. Stated differently, as described with respect to the record undo button 370 of FIG. 3, selection of record undo button 370 can cause the system to update the data entry box 222 with the original value of "Incident Default Value" and remove the edit tracker entry 360 as well as to update the data entry box 226 with the original or old value of "Unresolved" and remove the edit tracker entry 362. Further, any other edit tracker entries associated with that record can be reverted.

Figure 10:
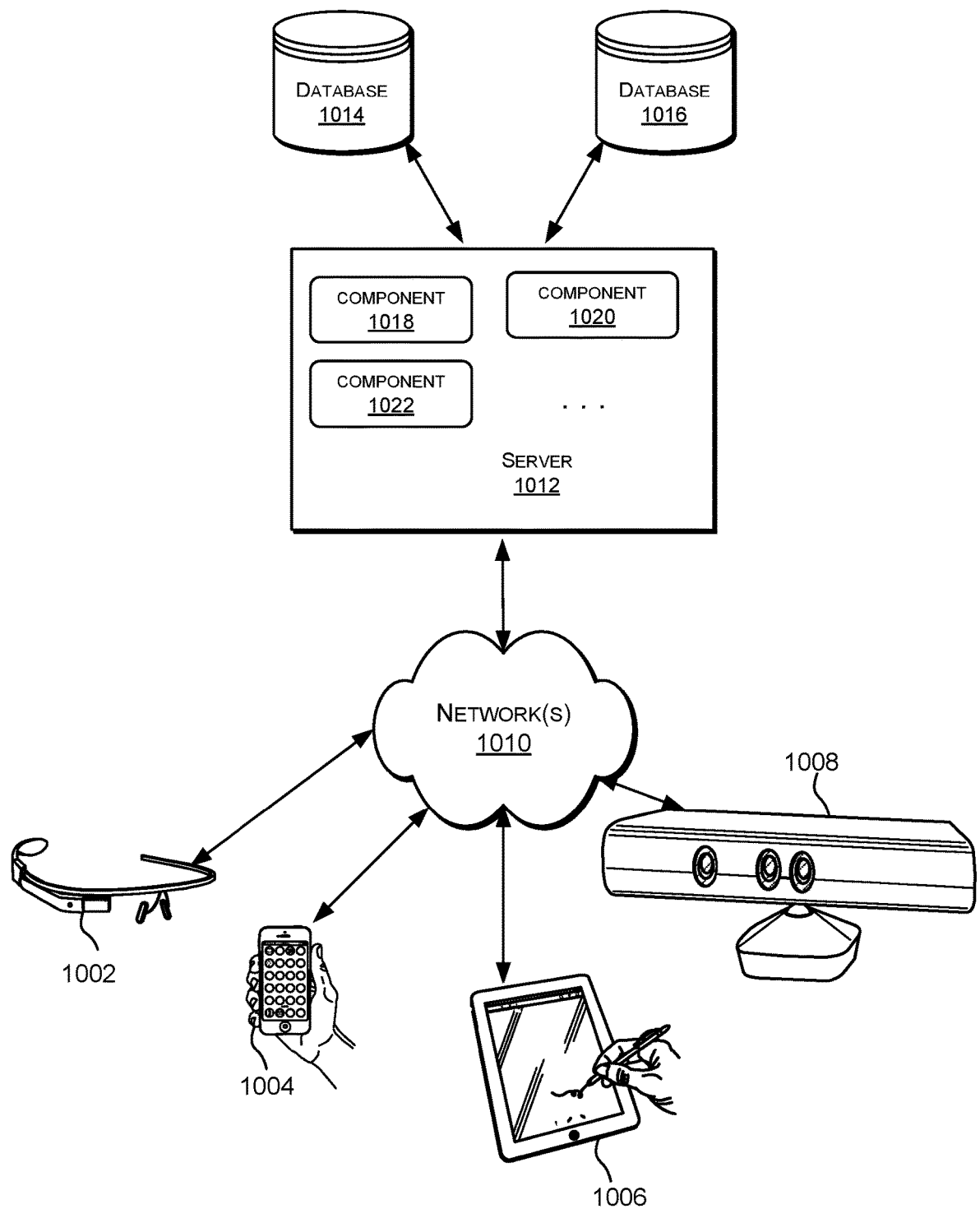
FIG. 10 is a block diagram illustrating components of an exemplary distributed system in which various embodiments may be implemented.

FIG. 10 is a block diagram illustrating components of an exemplary distributed system in which various embodiments may be implemented. In the illustrated embodiment, distributed system 1000 includes one or more client computing devices 1002, 1004, 1006, and 1008, which are configured to execute and operate a client application such as a web browser, proprietary client (e.g., Oracle Forms), or the like over one or more network(s) 1010. Server 1012 may be communicatively coupled with remote client computing devices 1002, 1004, 1006, and 1008 via network 1010.

In various embodiments, server 1012 may be adapted to run one or more services or software applications provided by one or more of the components of the system. In some embodiments, these services may be offered as web-based or cloud services or under a Software as a Service ("SaaS") model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in the figure, the software components 1018, 1020 and 1022 of system 1000 are shown as being implemented on server 1012. In other embodiments, one or more of the components of system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in the figure is thus one example of a distributed system for implementing an embodiment system and is not intended to be limiting.

Client computing devices 1002, 1004, 1006, and/or 1008 may be portable handheld devices (e.g., an iPhone®, cellular telephone, an iPad®, computing tablet, a personal digital assistant ("PDA")) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service ("SMS"), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1002, 1004, 1006, and 1008 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1010.

Although exemplary distributed system 1000 is shown with four client computing devices, any number of client computing devices may be supported. Other devices, such as devices with sensors, etc., may interact with server 1012.

Network(s) 1010 in distributed system 1000 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1010 can be a local area network ("LAN"), such as one based on Ethernet, Token-Ring and/or the like. Network(s) 1010 can be a wide-area network and the Internet. It can include a virtual network, including without limitation a virtual private network ("VPN"), an intranet, an extranet, a public switched telephone network ("PSTN"), an infra-red network, a wireless network (e.g., a network operating under any of the Institute of Electrical and Electronics ("IEEE") 802.11 suite of protocols, Bluetooth®, and/or any other wireless protocol); and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1012 may be adapted to run one or more services or software applications described in the foregoing disclosure. For example, server 1012 may correspond to a server for performing processing described above according to an embodiment of the present disclosure.

Server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more databases 1014 and 1016. Databases 1014 and 1016 may reside in a variety of locations. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network ("SAN"). Similarly, any necessary files for performing the functions attributed to server 1012 may be stored locally on server 1012 and/or remotely, as appropriate. In one set of embodiments, databases 1014 and 1016 may include relational databases, such as databases provided by Oracle®, that are adapted to store, update, and retrieve data in response to SQL-formatted commands.

Figure 11:
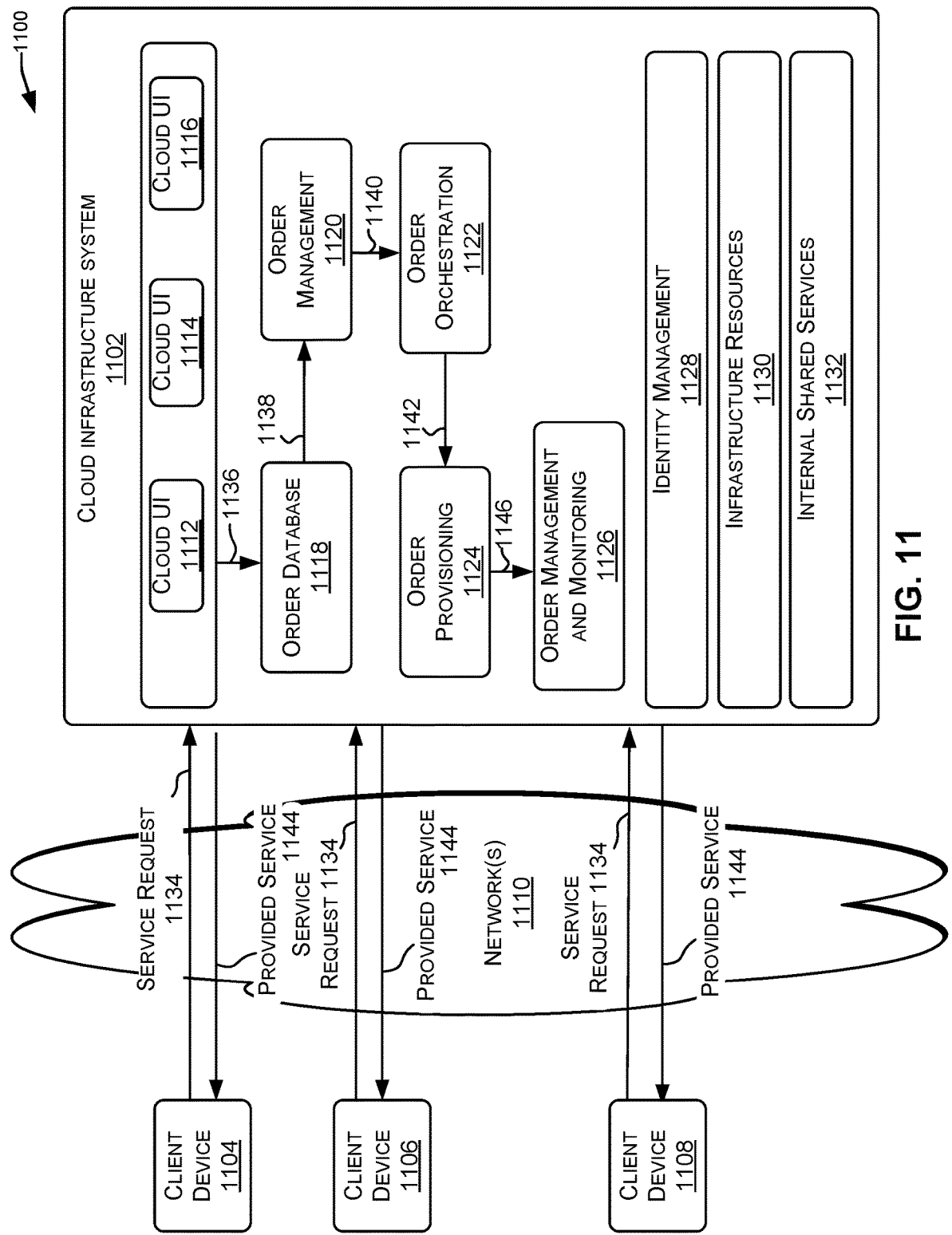
FIG. 11 is a block diagram illustrating components of a system environment by which services provided by embodiments may be offered as cloud services.

FIG. 11 is a block diagram illustrating components of a system environment by which services provided by embodiments may be offered as cloud services. In the illustrated embodiment, system environment 1100 includes one or more client computing devices 1104, 1106, and 1108 that may be used by users to interact with a cloud infrastructure system 1102 that provides cloud services. The client computing devices may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102.

It should be appreciated that cloud infrastructure system 1102 depicted in the figure may have other components than those depicted. Further, the embodiment shown in the figure is only one example of a cloud infrastructure system that may incorporate an embodiment. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for 1002, 1004, 1006, and 1008.

Although exemplary system environment 1100 is shown with three client computing devices, any number of client computing devices may be supported. Other devices such as devices with sensors, etc. may interact with cloud infrastructure system 1102.

Network(s) 1110 may facilitate communications and exchange of data between clients 1104, 1106, and 1108 and cloud infrastructure system 1102. Each network may be any type of network familiar to those skilled in the art that can support data communications using any of a variety of commercially-available protocols, including those described above for network(s) 1010.

Cloud infrastructure system 1102 may comprise one or more computers and/or servers that may include those described above for server 1012.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 1102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform.

In some embodiments, resources in cloud infrastructure system 1102 may be shared by multiple users and dynamically re-allocated per demand. Additionally, resources may be allocated to users in different time zones. For example, cloud infrastructure system 1130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 and by the services provided by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in the figure, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In exemplary operation 1134, a customer using a client device, such as client device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI), cloud UI 1112, cloud UI 1114 and/or cloud UI 1116 and place a subscription order via these UIs. The order information received by cloud infrastructure system 1102 in response to the customer placing an order may include information identifying the customer and one or more services offered by the cloud infrastructure system 1102 that the customer intends to subscribe to.

After an order has been placed by the customer, the order information is received via the cloud UIs, 1112, 1114 and/or 1116.

At operation 1136, the order is stored in order database 1118. Order database 1118 can be one of several databases operated by cloud infrastructure system 1118 and operated in conjunction with other system elements.

At operation 1138, the order information is forwarded to an order management module 1120. In some instances, order management module 1120 may be configured to perform billing and accounting functions related to the order, such as verifying the order, and upon verification, booking the order.

At operation 1140, information regarding the order is communicated to an order orchestration module 1122. Order orchestration module 1122 may utilize the order information to orchestrate the provisioning of services and resources for the order placed by the customer. In some instances, order orchestration module 1122 may orchestrate the provisioning of resources to support the subscribed services using the services of order provisioning module 1124.

In certain embodiments, order orchestration module 1122 enables the management of business processes associated with each order and applies business logic to determine whether an order should proceed to provisioning. At operation 1142, upon receiving an order for a new subscription, order orchestration module 1122 sends a request to order provisioning module 1124 to allocate resources and configure those resources needed to fulfill the subscription order. Order provisioning module 1124 enables the allocation of resources for the services ordered by the customer. Order provisioning module 1124 provides a level of abstraction between the cloud services provided by cloud infrastructure system 1100 and the physical implementation layer that is used to provision the resources for providing the requested services. Order orchestration module 1122 may thus be isolated from implementation details, such as whether or not services and resources are actually provisioned on the fly or pre-provisioned and only allocated/assigned upon request.

At operation 1144, once the services and resources are provisioned, a notification of the provided service may be sent to customers on client devices 1104, 1106 and/or 1108 by order provisioning module 1124 of cloud infrastructure system 1102.

At operation 1146, the customer's subscription order may be managed and tracked by an order management and monitoring module 1126. In some instances, order management and monitoring module 1126 may be configured to collect usage statistics for the services in the subscription order, such as the amount of storage used, the amount data transferred, the number of users, and the amount of system up time and system down time.

In certain embodiments, cloud infrastructure system 1100 may include an identity management module 1128. Identity management module 1128 may be configured to provide identity services, such as access management and authorization services in cloud infrastructure system 1100. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

Figure 12:
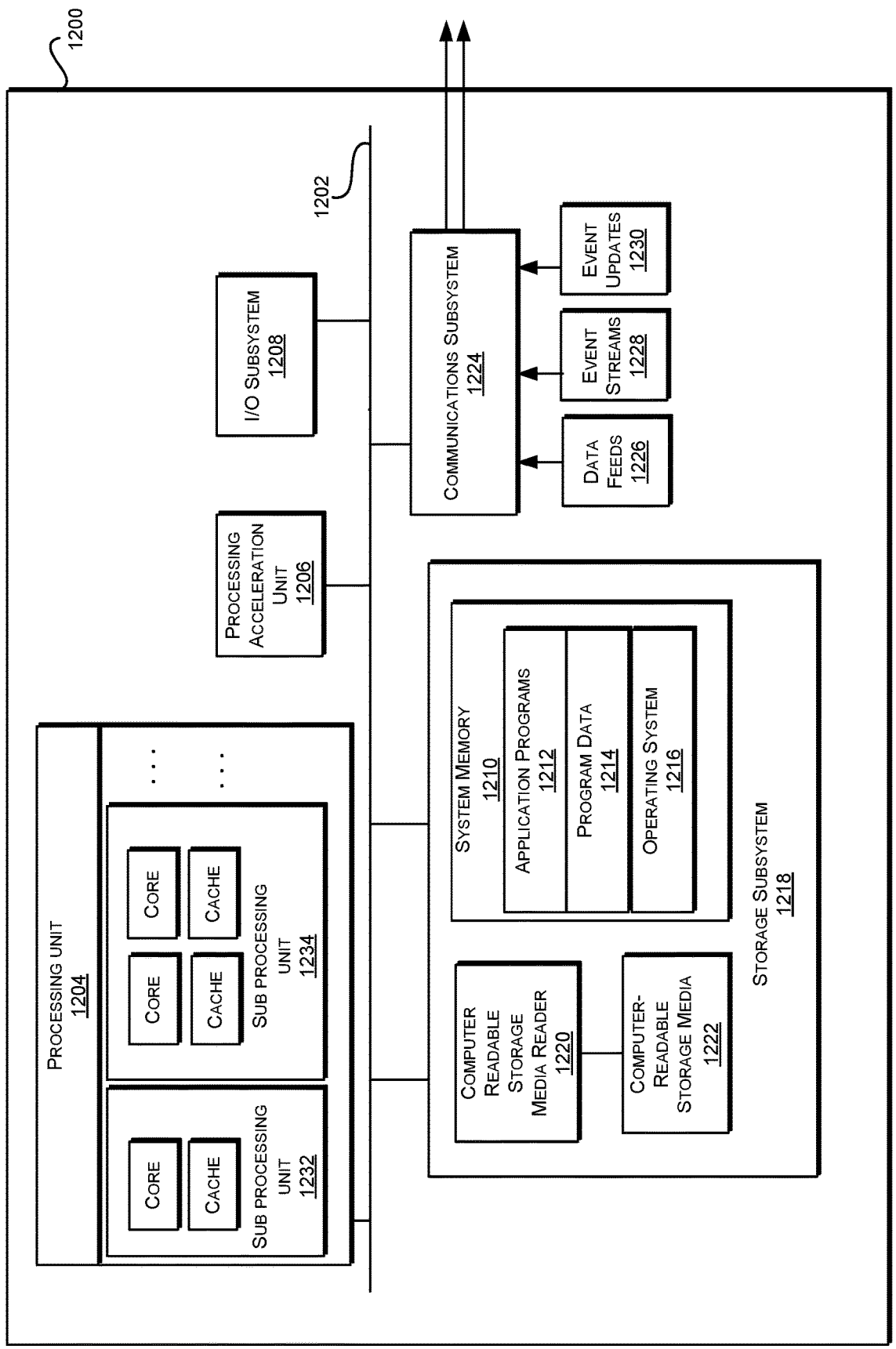
FIG. 12 is a block diagram illustrating an exemplary computer system in which embodiments may be implemented.

FIG. 12 is a block diagram illustrating an exemplary computer system in which embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture ("ISA") bus, Micro Channel Architecture ("MCA") bus, Enhanced ISA ("EISA") bus, Video Electronics Standards Association ("VESA") local bus, and Peripheral Component Interconnect ("PCI") bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor ("DSP"), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with various embodiments.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM ("EEPROM"), flash memory or other memory technology, CD-ROM, digital versatile disk ("DVD"), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus ("USB") flash drives, secure digital ("SD") cards, DVD disks, digital video tape, and the like. Computer-readable storage media 1222 may also include, solid-state drives ("SSD") based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM ("MRAM") SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency ("RF") transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums or memory devices, such as CD-ROMs or other type of optical disks, floppy diskettes, ROMs, RAMs, EPROMs, EEPROMs, magnetic or optical cards, flash memory, or other types of machine-readable mediums or memory devices suitable for storing electronic instructions. Alternatively, the methods may be performed by a combination of hardware and software.

While illustrative and presently preferred embodiments have been described in detail herein, it is to be understood that the inventive concepts may be otherwise variously embodied and employed, and that the appended claims are intended to be construed to include such variations, except as limited by the prior art.

What is claimed is:

1. A method for displaying an edit tracker of form-based entries on a web page, the method comprising:
    generating one or more tabs, wherein:
        each tab corresponds to a different data record from a database, and
        each tab comprises a plurality of data items, each data item of the plurality of data items having an item name and an item value, the item value being displayed in an editable field;
    receiving a selection of a first tab of the one or more tabs;
    displaying, in a data entry region of the web page, the first tab comprising a first plurality of data items of a corresponding first data record;
    receiving, for a first data item of the first plurality of data items via a first editable field displaying a first item value of the first data item, a changed first item value for the first data item;
    generating a first edit tracker entry for the first data item, the first edit tracker entry comprising a first item name of the first data item, the first item value of the first data item, and the changed first item value of the first data item;
    displaying the first edit tracker entry showing the first item value and the changed first item value in an edit tracker region of the web page along with the data entry region, wherein the edit tracker region is configured to display the first edit tracker entry among other edit tracker entries for other data items that were changed subsequent to the first item value;
    displaying a first undo button included in the first edit tracker entry for the first data item, wherein each edit tracker entry displays an undo button within the entry; and
    in response to receiving a selection of the first undo button, reverting the changed first item value to the first item value for the first data item without reverting values of the other data items that were changed subsequent to the first item value.

2. The method for displaying an edit tracker of form-based entries on the web page of claim 1, the method further comprising:
    in response to the selection of the first undo button:
        removing the first edit tracker entry for the first data item from the edit tracker region of the web page, and
        updating, in the data entry region of the web page, the first editable field displaying the changed first item value of the first data item with the first item value of the first data item.

3. The method for displaying an edit tracker of form-based entries on the web page of claim 1, the method further comprising:
    receiving a selection of a second tab of the one or more tabs;
    displaying, in the data entry region of the web page, the second tab comprising a second plurality of data items of a corresponding second data record; and
    removing display of the first edit tracker entry for the first data item in the edit tracker region of the web page.

4. The method for displaying an edit tracker of form-based entries on the web page of claim 3, the method further comprising:
    receiving, for a second data item of the second plurality of data items via a second editable field displaying a second item value of the second data item, a changed second item value; and
    displaying, in the edit tracker region of the web page, a second edit tracker entry for the second data item, the second edit tracker entry comprising a second item name of the second data item, the second item value of the second data item, and the changed second item value of the second data item, wherein:
        selection of the first tab updates the display of the edit tracker region to display the first edit tracker entry for the first data item, and
        selection of the second tab updates the display of the edit tracker region to display the second edit tracker entry for the second data item.

5. The method for displaying an edit tracker of form-based entries on the web page of claim 1, the method further comprising:
    identifying a rule that applies to the first data item, the rule indicating that a change to the first item value of the first data item results in a change of a second item value for a second data item;
    applying the rule; and
    updating the edit tracker region of the web page to display a second edit tracker entry for the second data item, the second edit tracker entry comprising a second item name of the second data item, the second item value of the second data item, and a changed second item value of the second data item.

6. The method for displaying an edit tracker of form-based entries on the web page of claim 1, the method further comprising:
    receiving a selection of the first edit tracker entry for the first data item; and
    in response to receiving the selection of the first edit tracker entry for the first data item, updating the data entry region of the web page to place an input focus of the web page on the first editable field, wherein the first editable field is a data entry box of a form for the first data record displayed on the first tab.

7. A system for displaying an edit tracker of form-based entries on a web page, the system comprising:
    a processor, and
    a memory having stored thereon instructions that, when executed by the processor, cause the processor to:
        generate one or more tabs, wherein:
            each tab corresponds to a different data record from a database, and each tab comprises a plurality of data items, each data item of the plurality of data items having an item name and an item value, the item value being displayed in an editable field;

receive a selection of a first tab of the one or more tabs;

display, in a data entry region of the web page, the first tab comprising a first plurality of data items corresponding to a first data record;

receive, for a first data item of the first plurality of data items via a first editable field displaying a first item value of the first data item, a changed first item value for the first data item;

generate a first edit tracker entry for the first data item, the first edit tracker entry comprising a first item name of the first data item, the first item value of the first data item, and the changed first item value of the first data item;

display the first edit tracker entry showing the first item value and the changed first item value in an edit tracker region of the web page along with the data entry region, wherein the edit tracker region is configured to display the edit tracker entry among other edit tracker entries for other data items; and display a first undo button included in the first edit tracker entry for the first data item, wherein each edit tracker entry displays an undo button within the entry; and in response to receiving a selection of the first undo button, reverting the changed first item value to the first item value for the first data item without reverting values of the other data items.

8. The system for displaying an edit tracker of form-based entries on the web page of claim 7, wherein the memory has stored thereon further instructions that, when executed by the processor, cause the processor to:

in response to the selection of the first undo button:
remove the first edit tracker entry for the first data item in the edit tracker region of the web page, and
update, in the data entry region of the web page, the first editable field displaying the changed first item value of the first data item with the first item value of the first data item.

9. The system for displaying an edit tracker of form-based entries on the web page of claim 7, wherein the memory has stored thereon further instructions that, when executed by the processor, cause the processor to:

receive a selection of a second tab of the one or more tabs;
display the second tab comprising a second plurality of data items of a corresponding second data record in the data entry region of the web page; and
remove display of the first edit tracker entry for the first data item in the edit tracker region of the web page.

10. The system for displaying an edit tracker of form-based entries on the web page of claim 9, wherein the memory has stored thereon further instructions that, when executed by the processor, cause the processor to:

receive, for a second data item of the second plurality of data items via a second editable field displaying a second item value of the second data item, a changed second item value; and
display, in the edit tracker region of the web page, a second edit tracker entry for the second data item, the second edit tracker entry comprising a second item name of the second data item, the second item value of the second data item, and the changed second item value of the second data item, wherein:
selection of the first tab updates the display of the edit tracker region to display the first edit tracker entry for the first data item, and
selection of the second tab updates the display of the edit tracker region to display the second edit tracker entry for the second data item.

11. The system for displaying an edit tracker of form-based entries on the web page of claim 7, wherein the memory has stored thereon further instructions that, when executed by the processor, cause the processor to:

identify a rule that applies to the first data item, the rule indicating that a change to the first item value of the first data item results in a change of a second item value for a second data item;
apply the rule; and
update the edit tracker region of the web page to display a second edit tracker entry for the second data item, the second edit tracker entry comprising a second item name of the second data item, the second item value of the second data item, and a changed second item value of the second data item.

12. The system for displaying an edit tracker of form-based entries on the web page of claim 7, wherein the memory has stored thereon further instructions that, when executed by the processor, cause the processor to:

receive a selection of the first edit tracker entry for the first data item; and
in response to receiving the selection of the first edit tracker entry for the first data item, update the data entry region of the web page to place a focus of the web page on the first editable field.

13. The method for displaying an edit tracker of form-based entries on the web page of claim 1, wherein the web page is an interface for a customer relationship management program used by service agents to handle support tickets for an enterprise.

14. A non-transitory computer-readable medium, having stored thereon instructions for displaying an edit tracker of form-based entries on a web page, which, when executed by a processor, cause the processor to:

generate one or more tabs, wherein:
each tab corresponds to a different data record from a database, and
each tab comprises a plurality of data items, each data item of the plurality of data items having an item name and an item value, the item value being displayed in an editable field;
receive a selection of a first tab of the one or more multiple graphical record tabs;
display, in a data entry region of the web page, the first tab comprising a first plurality of data items corresponding to a first data record;
receive, for a first data item of the first plurality of data items via a first editable field displaying a first item value of the first data item, a changed first item value for the first data item;
generate a first edit tracker entry for the first data item, the first edit tracker entry comprising a first item name of the first data item, the first item value of the first data item, and the changed first item value of the first data item;
display the first edit tracker entry showing the first item value and the changed first item value in an edit tracker region of the web page along with the data entry region, wherein the edit tracker region is configured to display the first edit tracker entry among other edit tracker entries for other data items; and display a first undo button included in the first edit tracker entry for the first data item, wherein each edit tracker entry displays an undo button within the entry; and in response to receiving a selection of the first undo button, reverting the changed first item value to the first item value for the first data item without reverting values of the other data items.

15. The computer-readable medium of claim 14, having stored thereon further instructions that, when executed by the processor, cause the processor to:

in response to the selection of the first undo button:

remove the first edit tracker entry for the first data item in the edit tracker region of the web page, and update, in the data entry region of the web page, the first editable field displaying the changed first item value of the first data item with the first item value of the first data item.

16. The computer-readable medium of claim 14, having stored thereon further instructions that, when executed by the processor, cause the processor to:

receive a selection of a second tab of the one or more tabs;

display the second tab comprising a second plurality of data items of a corresponding second data record in the data entry region of the web page; and remove display of the first edit tracker entry for the first data item in the edit tracker region of the web page.

17. The computer-readable medium of claim 16, having stored thereon further instructions that, when executed by the processor, cause the processor to:

receive, for a second data item of the second plurality of data items via a second editable field displaying a second item value of a second data item, a changed second item value; and display, in the edit tracker region of the web page, a second edit tracker entry for the second data item, the second edit tracker entry comprising a second item name of the second data item, the second item value of the second data item, and the changed second item value of the second data item, wherein:

selection of the first tab updates the display of the edit tracker region to display the first edit tracker entry for the first data item, and selection of the second tab updates the display of the edit tracker region to display the second edit tracker entry for the second data item.

18. The computer-readable medium of claim 14, having stored thereon further instructions that, when executed by the processor, cause the processor to:

identify a rule that applies to the first data item, the rule indicating that a change to the first item value of the first data item results in a change of a second item value for a second data item;

apply the rule; and update the edit tracker region of the web page to display a second edit tracker entry for the second data item, the second edit tracker entry comprising a second item name of the second data item, the second item value of the second data item, and a changed second item value of the second data item.

19. The computer-readable medium of claim 14, having stored thereon further instructions that, when executed by the processor, cause the processor to:

receive a selection of the first edit tracker entry for the first data item; and in response to receiving the selection of the first edit tracker entry for the first data item, update the data entry region of the web page to place a focus of the web page on the first editable field.

20. The method for displaying an edit tracker of form-based entries on the web page of claim 1, the method further comprising:

displaying a second undo button included in a second edit tracker entry for a second data item of the first plurality of data items, wherein selection of the second undo button (i) causes a changed second item value for the second data item to revert to a second item value, and (ii) does not cause the changed first item value to revert to the first item value, and wherein the selection of the first undo button does not cause the changed second item value to revert to the second item value.

* * * * *